Jan. 20, 1953 H. M. HART 2,626,247
FLUIDIZED SOLIDS FLOW CONTROL SYSTEM
Filed June 13, 1951 2 SHEETS—SHEET 1

INVENTOR.
Hal M. Hart
BY Donald C. Payne
ATTORNEY

Patented Jan. 20, 1953

2,626,247

UNITED STATES PATENT OFFICE 2,626,247

FLUIDIZED SOLIDS FLOW CONTROL SYSTEM

Hal M. Hart, Independence, Mo., assignor to Standard Oil Company, Chicago, Ill., a corporation of Indiana Application June 13, 1951, Serial No. 231,293

4 Claims. (Cl. 252—417)

1

This invention relates to flow control of fluidized solids in a vertical column and it pertains more particularly to an improved method and means for controlling downward flow of dense phase aerated solids in regenerator standpipes of fluid catalytic cracking systems.

While fluid catalytic cracking systems have been extensively employed in the petroleum industry for the past ten years, there are many phases of the fluidization phenomenon relating to fluidized solids flow that are not fully understood. Much progress has been made toward minimizing erosion and toward the obtaining of smoothly controlled fluidized solids flow, but the slide valves at the base of catalyst standpipes still become so eroded that they require replacement from time to time and in many circumstances bumping, surging and other flow irregularities are encountered. An object of my invention is to provide an improved method and means for obtaining a controlled smooth catalyst flow and for eliminating or greatly minimizing erosion of standpipe slide valves, particularly on the regenerator side of a fluid catalytic cracking system.

Broadly speaking, the object of the invention is to provide an improved method and means for controlling the apparent or effective viscosity and/or density characteristics of dense phase fluidized solids at an up stream point in a fluidized solids flow system. Another object is to avoid the necessity of introducing controlled amounts of aeration gas at one or more spaced points in a fluidized catalyst standpipe itself. A further object is to control the pressure at the base of a fluidized solids column (and hence the pressure drop across a flow regulation valve or orifice at that point) more effectively than it has heretofore been controllable without altering flow rates or encountering flow difficulties. Other objects will be apparent as the detailed description of the invention proceeds.

I have found that the pressure at the base of a column of fluidized solids may be controlled by introducing both air and steam in controlled amounts into the well or hopper which is superimposed above the column and which affords a constantly replenished supply of fluidized solids for introduction into the top of said column. Such well or hopper is of a larger diameter than the standpipe with which it communicates and it receives dense phase fluidized solids directly from the dense solids phase in the regenerator.

In practicing my invention, a mixture of air and steam is introduced into the solids in the

2 hopper (as distinguished from the standpipe) and the ratio of air to steam is regulated to control the pressure at the base of the standpipe and/or the pressure drop across the standpipe. At a predetermined catalyst flow rate, the pressure at the base of the standpipe column cannot always be controlled over the desired amplitude by simply controlling the amount of air introduced into the well or hopper and the introduction of air alone at this point frequently results in pressures at the base of the column which are unduly high so that considerable throttling is required of the standpipe slide valves which in turn results in excessive erosion. If steam alone is employed instead of air for introduction into the hopper, the solids flow is not always smooth—it may be disturbed by surging, bumping, or other irregularities. The use of a mixture of both steam and air gives remarkably smooth catalyst flow. I have also found that the pressure at the base of the column (or pressure drop across the slide valve) is reduced by increasing the rate of steam injection while holding the air rate constant, or by decreasing the rate of air injection while holding the steam rate constant. Similarly, the pressure at the base of the column (or pressure drop across the slide valve) may be increased by decreasing the rate of steam injection, while the air rate is held constant or by increasing the rate of air injection while the steam rate is held constant.

I am unable to explain the fact that steam, when introduced into the hopper, has an effect on the pressure at the base of the column which is opposite to the effect of air so introduced. However, I have actually found that an increase in steam always reduces the static head at the base of the standpipe and an increase in air always has the opposite effect. This phenomenon has been repeatedly observed over a wide range of operating conditions, at high and low circulation rates, with coarse catalyst and with relatively fine catalyst and with synthetic catalyst as well as with natural catalyst. It may be that the introduction of steam into the hopper effects an increase in viscosity of the fluidized solids and that the decreased static head at the base of the standpipe is accounted for by loss in pressure due to friction or flow resistance in the standpipe. Whatever the explanation may be, the fact remains that static head at the base of the standpipe may be closely controlled by varying the ratio of steam to air introduced into the well or hopper which is superimposed above the standpipe and which provides a constantly replenished supply of fluidized solids for said standpipe.

In accordance with my invention, a gas distributor is employed in each well or hopper which is superimposed above its respective standpipe. Separate lines for introducing air and steam, respectively, communicate with said distributor. A pressure indicator is employed at the base of the standpipe and/or a pressure differential indicator is employed across the slide valve. Flow control valves are employed in the steam and/or air inlet lines which lead to the distributor and these flow control valves may be operated by any well known automatic control instruments so that when air is introduced at a constant rate, the steam rate will be automatically decreased when there it a decrease in pressure at the bottom of the column (or a decrease in pressure differential across the slide valve). Alternatively, the steam rate may be constant and the air rate may be automatically decreased when there is an increase in pressure at the bottom of the column or across the slide valve.

The invention will be more clearly understood from the following detailed description read in conjunction with the accompanying drawings which form a part of this specification and in which.

While the invention will be described in connection with a fluid catalytic cracking unit employing Super Filtrol catalyst, it should be understood that the invention is applicable to any fluidized solids system wherein the solids flow downwardly in standpipes from a constantly replenished source in a superimposed well or hopper above said standpipes.

Figure 1:
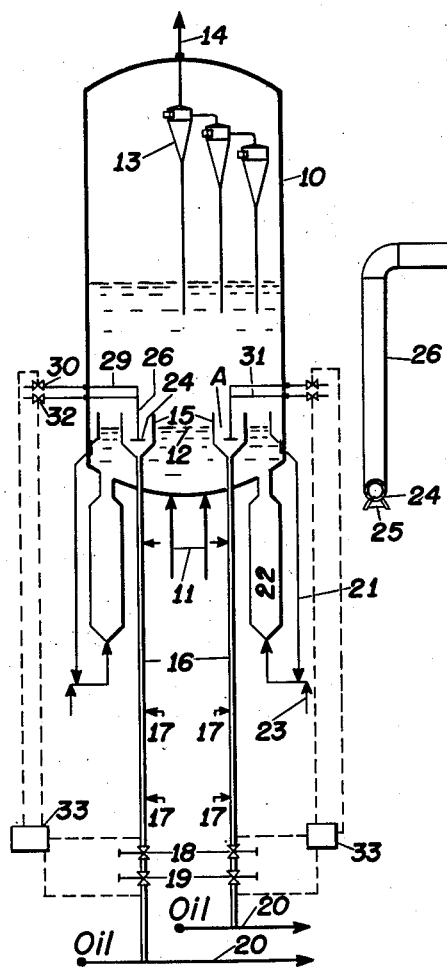
Fig. 1 is a diagrammatic sectional view of a fluidized catalytic cracking regenerator illustrating the arrangement of standpipes with superimposed wells or hoppers, slide valves and automatic controls.
Figure 2:
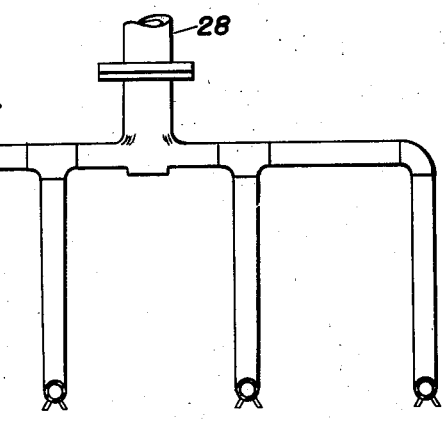
Fig. 2 is a side view of the distributor for introducing mixtures of air and steam into the hoppers.
Figure 3:
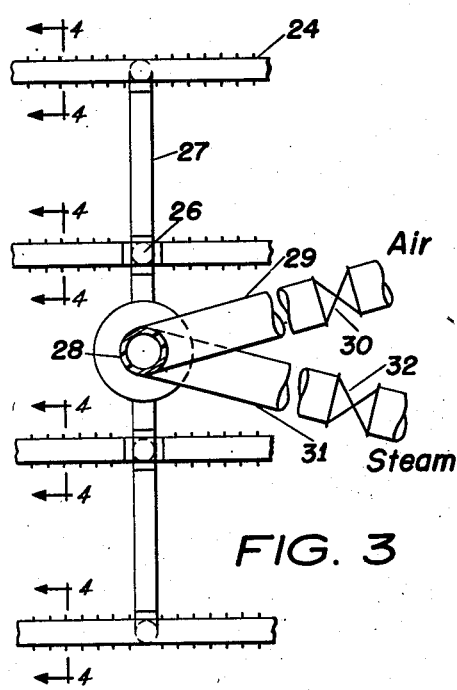
Fig. 3 is a top view of the distributor.

Referring to Fig. 1, the regenerator 10 of a commercial fluid catalytic cracking system is provided with two or more inlet lines 11 for introducing spent catalyst and air, the introduced catalyst and air being distributed by grid 12 above which a dense pase of catalyst is maintained in fluidized dense phase condition. Cyclone separators 13 are employed in the dilute phase above the dense phase for separating entrained solids from regeneration gases discharged from the top of the regenerator through line 14. Regenerated catalyst is collected in wells or hoppers 15 which are superimposed above standpipes 16. It has previously been the practice to introduce controlled amounts of aeration gas into such standpipes through line 17 at spaced points along the standpipe. At the base of each standpipe there are a pair of slide valves 18 and 19 for controlling the flow of regenerated catalyst into vaporized charging stock transfer lines 20 which conduct the catalyst suspension to the reactor. The pressure in the charging stock transfer lines 20 is usually held constant and may, for example, be about 19 p. s. i. g. The pressure at the bottom of the standpipes and immediately above slide valve 18 should preferably be substantially constant and only about 1 to 3 pounds higher than the pressure in the charging stock transfer line 20. A high pressure at the base of the column necessarily results in a high pressure drop across the slide valve which in turn causes severe slide valve erosion. For a smoothness of operation, it is desirable to maintain a substantially constant pressure at the bottom of each standpipe immediately above the slide valve and if this pressure can be held constant, then the lower pressure drop may be employed than would otherwise be necessary from the standpoint of safety and slide valve erosion can be practically eliminated. It should be pointed out that while two slide valves are shown, one of these valves is usually in an open position and is in effect a stand-by for use when the other slide valve is rendered ineffective by erosion; in the practice of my invention, a single slide valve at the base of each standpipe will usually be adequate.

Temperature control in the regenerator is effected by withdrawing catalyst through line 21, passing the withdrawn catalyst through coolers 22 by additional air introduced through line 23 and then returning the cooled catalyst to the space below grid 12. It should be understood that the flow of regenerated catalyst through these recycle coolers may be controlled in the same manner as will hereinafter be described for controlling the flow of solids through standpipes 16.

Figure 4:
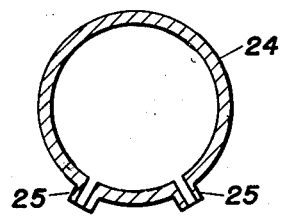
Fig. 4 is a detailed section taken along the lines 4—4 of Fig. 3.

In the lower part of each of the wells or hoppers 15, there are spaced distributor pipes 24 provided with distributor nozzles 25 (see Fig. 4), each of the distributor pipes being connected by a pipe 26 to header 27 and gas inlet line 28. Air is introduced into line 28 through line 31 in amounts controlled by valve 32. Valve 30 and/or 32 may be automatically operated by any conventional solenoid or fluid operated closure and opening means which in turn are actuated in accordance with the pressure at the base of standpipes 16 or the pressure drop across valves 18 and 19 by means of a conventional pressure controller 33. Thus, pressure controller 33 may be set to maintain a constant pressure drop of about 2 p. s. i. across the slide valve 18 (and/or 19); with a constant flow of air through line 30, the pressure controller 33 will automatically effect a partial closing of steam valve 32 when there is a decrease in pressure and will partially open valve 32 when there is an increase in the slide valve pressure differential. When a constant steam rate is employed so that valve 32 is unchanged, control means 33 will decrease the air rate by partially closing valve 30 when there is an increase in slide valve pressure differential and it will increase the air rate by partially opening valve 30 when there is a decrease in slide valve pressure differential. In either case, it will be observed that both air and steam are introduced into the fluidized solids in the upper hopper 15 (instead of through line 17 into the standpipe itself) and it will be seen that the ratio of air to steam is regulated in accordance with the pressure at the base of the column of solids in the standpipe.

Figure 5:
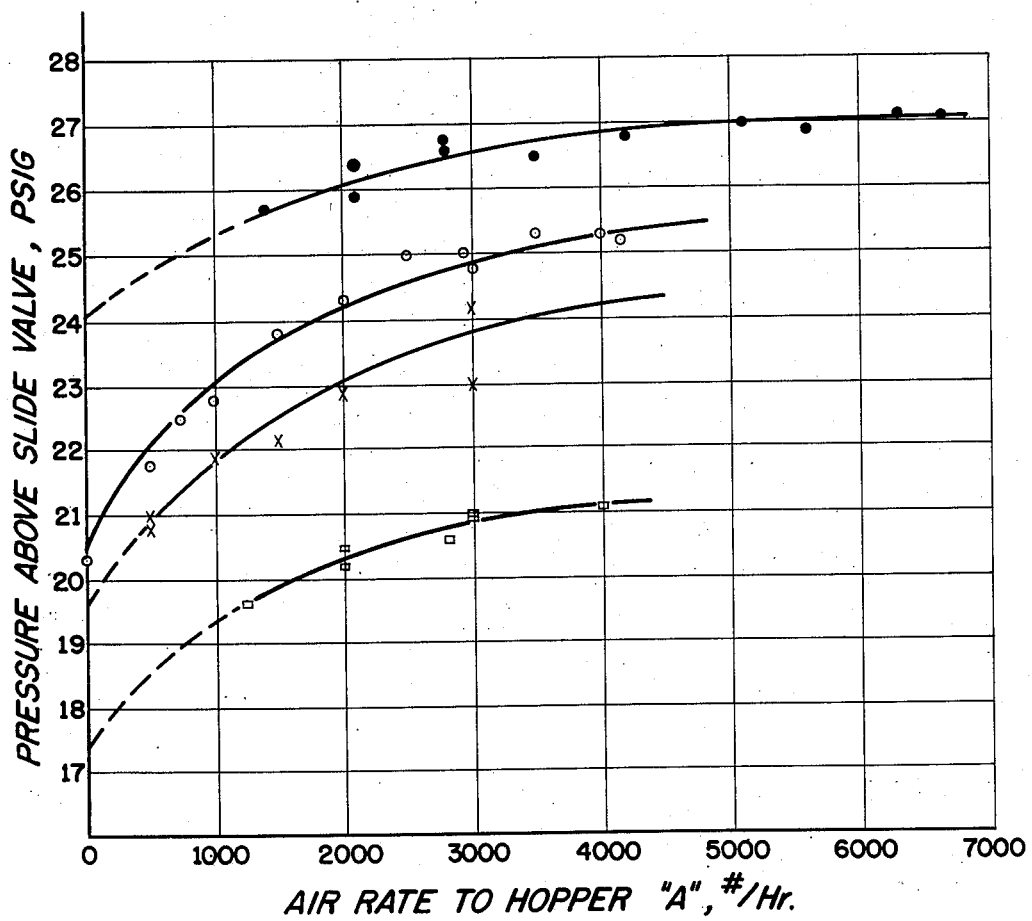
Fig. 5 is a chart illustrating the effect of air and steam rates in the well or hopper on the pressure at the bottom of the standpipe.

To give an example of the amounts and/or ratios of air and steam required for obtaining predetermined static heads at the base of the columns or standpipes, reference is made to Fig. 5 wherein the effect of relative amounts of air and steam upon pressure at the bottom of the standpipe is graphically illustrated. The data plotted in this graph were obtained with catalyst circulation rates of four tons per minute during the commercial operation of a fluid catalytic cracking unit with Super Filtrol catalyst under conventional regeneration conditions. It will be observed that when no steam was employed at all, the pressure above the slide valve was unduly high regardless of the amount of air (or even absence of air) introduced into hopper 15; this would result in an unduly high pressure drop across the slide valves and lead to serious valve erosion. With a constant steam rate of 3,000 pounds per hour introduced into the upper well or hopper (which in this case was about 8 feet deep with a cross sectional area of about 35 square feet communicating with a standpipe about 20 inches in diameter and about 70 feet long) it will be noted that there is a sharp decrease in pressure above the slide valve with various rates of air introduction. With 4,500 pounds per hour of steam, the static pressure at the base of the column was still further reduced at each corresponding air rate and at 6000 pounds per hour of steam, the static pressure at the base of the column was markedly reduced. In this particular example, when it is desired to maintain a pressure above the slide valve of 22 p. s. i. g., the steam rate of 4500 p. s. i. g. may be employed with the air rate normally set for about 1200 pounds per hour. If the pressure increases above the slide valve, the air valve 30 is slowly closed, thereby decreasing the air rate to the hopper until the desired 22 pounds pressure is re-established.

While my invention has been described in connection with a particular example thereof, it should be understood that this example is given simply by way of illustration and that the invention is not limited thereto. The particular amounts of air and steam and the particular ratios required will be dependent upon the structural size and arrangement of the apparatus employed, the nature and practical size of the fluidized solids, and the solid circulation rate. Application of the invention in alternative situations will be apparent from the above description to those skilled in the art.

I claim:

1. In a system in which the top of a withdrawal column of fluidized solids is surmounted by a hopper and a fluidized dense phase mass of said solids is maintained in and above said hopper to constantly replenish the solids in said column, the method of maintaining a substantially constant pressure at the base of said column, which method comprises introducing both air as one component of aeration gas and steam as another component of said aeration gas into said hopper, adjusting the rates of flow of said air and steam to obtain the desired pressure at the base of said column, and thereafter maintaining the rate of flow of one of said components constant and varying the rate of flow of the other component in response to a deviation from the desired pressure to restore the pressure to the desired value, the rate of flow of steam being increased in response to an increase in pressure and decreased in response to a decrease in pressure from the desired value when the air rate is held constant and the rate of flow of air being decreased in response to an increase in pressure and increased in response to a decrease in pressure from the desired value when the steam rate is held constant.

2. The method of claim 1 wherein the air component of the aeration gas is introduced into said hopper at a constant rate and the steam rate is varied.

3. The method of claim 1 wherein the steam component of the aeration gas is introduced into the hopper at a constant rate and the air rate is varied.

4. The method of claim 1 wherein the fluidized dense phase mass of solids is a fluidized dense phase mass of cracking catalyst which is undergoing regeneration.

HAL M. HART.

REFERENCES CITED

The following references are of record in the file of this patent:

UNITED STATES PATENTS

| Number | Name | Date |
|---|---|---|
| 2,446,678 | Voohees | Aug. 10, 1948 |
| 2,481,439 | Ogorzaly | Sept. 6, 1949 |